(12) United States Patent
Trimmer et al.

(10) Patent No.: US 11,199,253 B2
(45) Date of Patent: Dec. 14, 2021

(54) OIL FILTER ASSEMBLY

(71) Applicant: J. C. Bamford Excavators Limited, Uttoxeter (GB)

(72) Inventors: Gareth Trimmer, Uttoxeter (GB); Gethin Thomas, Uttoxeter (GB); Tom Hurd, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 368 days.

(21) Appl. No.: 15/928,028

(22) Filed: Mar. 21, 2018

(65) Prior Publication Data

US 2018/0274657 A1 Sep. 27, 2018

(30) Foreign Application Priority Data

Mar. 21, 2017 (GB) ..................... 1704431

(51) Int. Cl.
| | |
|---|---|
| *F16H 57/04* | (2010.01) |
| *B01D 35/06* | (2006.01) |
| *B01D 29/90* | (2006.01) |
| *B01D 35/30* | (2006.01) |
| *B01D 29/07* | (2006.01) |

(Continued)

(52) U.S. Cl.
CPC ....... *F16H 57/0404* (2013.01); *B01D 29/071* (2013.01); *B01D 29/902* (2013.01); *B01D 35/005* (2013.01); *B01D 35/0273* (2013.01); *B01D 35/06* (2013.01); *B01D 35/30* (2013.01); *B01D 35/306* (2013.01);

(Continued)

(58) Field of Classification Search
None
See application file for complete search history.

(56) References Cited

U.S. PATENT DOCUMENTS 1,352,120 A * 9/1920 Du Pont .............. B01D 35/005
                                                  210/454
1,436,294 A * 11/1922 Scott .................. B60K 15/0406
                                                  210/473

(Continued)

FOREIGN PATENT DOCUMENTS

| CN | 204704599 U | 10/2015 |
|---|---|---|
| EP | 1733775 A1 | 12/2006 |

(Continued)

OTHER PUBLICATIONS

Extended European Search Report issued in European Patent Application Noo. 18162950.2, dated Jul. 19, 2018.

(Continued)

*Primary Examiner* — Robert J Popovics
(74) *Attorney, Agent, or Firm* — Marshall, Gerstein & Borun LLP

(57) ABSTRACT

An oil filter assembly for a differential housing, including a filter housing for releasably mounting in a drive axle housing and defining an internal volume for containing oil to be filtered, a mounting arrangement for releasably securing the filter assembly to a drive axle housing, and a filter element for filtering particulate contaminants from oil in a drive axle. The filter housing includes an inlet on an upper portion thereof and an outlet on a lower portion thereof to define an flow path therethrough, and wherein the filter element is located downstream of the inlet.

20 Claims, 10 Drawing Sheets

(51) Int. Cl.
*B01D 35/027* (2006.01)
*B01D 35/00* (2006.01)
*E02F 9/20* (2006.01)

(52) U.S. Cl.
CPC ... *F16H 57/0483* (2013.01); *B01D 2201/306* (2013.01); *E02F 9/202* (2013.01)

(56) References Cited

U.S. PATENT DOCUMENTS

| | | | | |
|---|---|---|---|---|
| 1,581,947 A * | 4/1926 | Hobbs | | B01D 35/023 210/473 |
| 1,677,118 A * | 7/1928 | Ford | | B01D 29/23 210/457 |
| 1,693,741 A * | 12/1928 | Wuest | | B01D 29/96 210/448 |
| 1,814,656 A * | 7/1931 | Anschicks | | B65D 47/02 220/86.1 |
| 1,817,376 A * | 8/1931 | Izquierdo | | E03C 1/282 210/447 |
| 1,961,498 A * | 6/1934 | Krueger | | F16L 55/24 210/305 |
| 1,976,975 A * | 10/1934 | Williams | | B60K 15/0403 220/86.2 |
| 2,010,445 A * | 8/1935 | Sparks | | B60K 15/04 220/86.2 |
| 2,019,094 A * | 10/1935 | Rice | | B01D 35/02 210/445 |
| 2,087,385 A * | 7/1937 | Naujoks | | B01D 35/02 210/306 |
| 2,145,759 A * | 1/1939 | Fellows | | B60K 15/0406 220/86.3 |
| 2,408,923 A * | 10/1946 | Frederick | | F16H 57/0404 74/606 R |
| 2,524,313 A * | 10/1950 | Gerling | | B60K 15/04 210/453 |
| 2,733,775 A * | 2/1956 | Dupure | | B01D 35/023 210/348 |
| 3,502,176 A | 3/1970 | Terry | | |
| 3,502,177 A * | 3/1970 | Christie | | F16H 48/08 184/11.1 |
| 3,749,248 A * | 7/1973 | Dickinson | | F01M 1/10 210/238 |
| 3,750,889 A * | 8/1973 | Acosta | | B01D 29/52 210/497.01 |
| 3,834,539 A | 9/1974 | Thompson | | |
| 3,847,249 A | 11/1974 | Oehring | | |
| 4,033,872 A * | 7/1977 | Mori | | B01D 35/027 210/167.04 |
| 4,169,057 A * | 9/1979 | Gideon | | B01D 29/05 210/236 |
| 4,352,301 A * | 10/1982 | Fleury | | F16H 57/0434 184/6.12 |
| 4,459,208 A * | 7/1984 | Lemon | | B01D 29/35 210/167.02 |
| 4,608,166 A * | 8/1986 | Cain | | B01D 29/111 210/232 |
| 4,640,771 A * | 2/1987 | Whalen | | B01D 29/15 210/167.01 |
| 4,851,118 A * | 7/1989 | Kurihara | | B01D 29/15 210/315 |
| 4,860,805 A * | 8/1989 | Townsend | | A47C 27/085 141/382 |
| 4,918,017 A | 4/1990 | Greenstreet et al. | | |
| 5,294,350 A * | 3/1994 | Murphy | | B03C 1/286 184/6.25 |
| 5,312,545 A * | 5/1994 | Starin | | B01D 35/027 210/172.6 |
| 5,453,181 A * | 9/1995 | Dahlback | | F16H 57/0415 184/11.1 |
| 5,476,185 A * | 12/1995 | Jimerson | | B60K 15/0403 220/86.3 |
| 5,476,582 A * | 12/1995 | Camping | | B01D 35/06 210/85 |
| 5,507,858 A * | 4/1996 | Jepson | | B01D 19/0031 95/262 |
| 5,525,215 A * | 6/1996 | Marchionda | | A47J 37/1285 210/95 |
| 5,701,739 A | 12/1997 | Ohashi et al. | | |
| 6,212,887 B1 * | 4/2001 | Takada | | B60K 17/10 60/453 |
| 6,308,350 B1 * | 10/2001 | Marchionda | | E03C 1/282 4/292 |
| 6,322,474 B1 * | 11/2001 | Hauser | | B60K 17/10 475/230 |
| 6,461,506 B1 * | 10/2002 | Bradford | | B01D 29/94 210/309 |
| 6,634,459 B1 * | 10/2003 | Litkenhus | | F04C 2/086 184/6.12 |
| 6,641,637 B2 * | 11/2003 | Kallsen | | B01D 29/21 55/385.3 |
| 6,688,433 B1 * | 2/2004 | Hauser | | B60K 17/10 184/6.24 |
| 6,691,511 B1 * | 2/2004 | Phanco | | B01D 35/0273 184/6.24 |
| 6,840,042 B1 * | 1/2005 | Taylor | | B01D 29/15 60/454 |
| 6,849,179 B1 * | 2/2005 | Taylor | | B01D 35/027 210/223 |
| 6,858,134 B2 * | 2/2005 | Yates | | B01D 29/21 210/167.01 |
| 6,880,334 B1 * | 4/2005 | Phanco | | B01D 35/0273 60/453 |
| 7,160,447 B2 * | 1/2007 | Yates | | B01D 29/21 210/167.04 |
| 7,178,426 B2 * | 2/2007 | Turner | | F16H 57/0447 184/11.1 |
| 7,780,013 B1 * | 8/2010 | Kern | | E03B 7/074 210/435 |
| D637,698 S * | 5/2011 | Greene | | D23/268 |
| 8,029,667 B2 * | 10/2011 | Santinon | | B01D 35/30 210/172.6 |
| 8,088,079 B2 * | 1/2012 | Kaye | | A61B 10/0283 600/562 |
| 8,382,993 B1 * | 2/2013 | Wisek | | E03C 1/26 210/767 |
| 8,651,078 B2 * | 2/2014 | Fasold | | F01M 11/0408 123/90.33 |
| 8,746,480 B2 * | 6/2014 | Wholey | | B60K 15/0403 220/86.3 |
| 8,858,794 B2 * | 10/2014 | Lappeman | | B01D 35/04 210/300 |
| 9,163,715 B2 * | 10/2015 | Valente | | F16H 57/0427 |
| 9,238,187 B2 * | 1/2016 | Kawaguchi | | B01D 29/15 |
| 9,410,609 B1 * | 8/2016 | Jongebloed | | F16H 57/05 |
| 9,671,318 B1 * | 6/2017 | Bedoe | | A61B 10/02 |
| 9,944,229 B2 * | 4/2018 | Kelly | | F16H 57/037 |
| 9,997,754 B2 * | 6/2018 | Beylich | | H01M 10/4207 |
| 10,064,609 B2 * | 9/2018 | Quick | | B01D 29/0043 |
| 10,279,625 B2 * | 5/2019 | Kelly | | F16H 57/031 |
| 10,328,366 B2 * | 6/2019 | Hudgens | | B01D 29/902 |
| 10,441,902 B2 * | 10/2019 | Tange | | B01D 29/902 |
| 10,463,999 B2 * | 11/2019 | Washington | | B01D 35/005 |
| 10,471,188 B1 * | 11/2019 | Zollinger | | A61M 1/79 |
| 10,487,861 B2 * | 11/2019 | Costello | | F15B 21/041 |
| 10,494,962 B2 * | 12/2019 | Yuki | | B01D 35/0273 |
| 10,603,416 B2 * | 3/2020 | Zollinger | | B09B 3/0075 |
| 10,688,421 B2 * | 6/2020 | Jacquerie | | F01M 25/20 |
| 10,792,525 B2 * | 10/2020 | Cray | | A62C 3/065 |
| 10,801,605 B2 * | 10/2020 | Nakano | | F16H 57/0404 |
| 10,874,381 B2 * | 12/2020 | Quick | | B01D 29/0043 |
| 2002/0121473 A1 * | 9/2002 | Boast | | B01D 35/0273 210/450 |
| 2004/0118761 A1 * | 6/2004 | Yates | | B01D 35/153 210/172.4 |
| 2004/0144703 A1 * | 7/2004 | Davenport | | E03C 1/264 210/153 |
| 2006/0063633 A1 * | 3/2006 | Turner | | F16H 57/0447 475/220 |

(56) References Cited

U.S. PATENT DOCUMENTS

| | | | | |
|---|---|---|---|---|
| 2007/0017873 A1* | 1/2007 | Jurado | F16H 57/043 | 210/695 |
| 2007/0163937 A1* | 7/2007 | Sato | B01D 35/02 | 210/232 |
| 2007/0163948 A1* | 7/2007 | Sato | B01D 27/005 | 210/455 |
| 2007/0191731 A1* | 8/2007 | Kaye | A61B 10/0096 | 600/562 |
| 2007/0221554 A1* | 9/2007 | Wright | B01D 46/0087 | 210/120 |
| 2010/0043594 A1* | 2/2010 | Hilker | F16H 57/0483 | 74/607 |
| 2010/0206800 A1* | 8/2010 | Veit | B01D 29/111 | 210/416.4 |
| 2011/0036763 A1* | 2/2011 | Santinon | B01D 35/30 | 210/232 |
| 2011/0079549 A1 | 4/2011 | Meijer | | |
| 2012/0043267 A1* | 2/2012 | Thienel | B01D 36/003 | 210/172.1 |
| 2012/0067807 A1* | 3/2012 | Lappeman | B01D 21/2483 | 210/301 |
| 2014/0091023 A1* | 4/2014 | Long | F16N 7/36 | 210/167.08 |
| 2015/0141192 A1* | 5/2015 | Valente | F16H 48/06 | 475/160 |
| 2015/0247431 A1* | 9/2015 | Yuki | B01D 35/0273 | 210/435 |
| 2016/0046150 A1* | 2/2016 | Kelly | B60B 35/163 | 156/60 |
| 2016/0046151 A1* | 2/2016 | Kelly | B60R 1/002 | 74/607 |
| 2016/0047461 A1* | 2/2016 | Kelly | F16H 57/031 | 74/607 |
| 2016/0199768 A1* | 7/2016 | Dunning | B60C 23/00 | 152/416 |
| 2016/0245136 A1* | 8/2016 | Takatsugi | B01D 35/0273 | |
| 2017/0160169 A1* | 6/2017 | Bedoe | A61B 10/02 | |
| 2018/0001235 A1* | 1/2018 | Tange | F01N 3/2066 | |
| 2018/0038394 A1* | 2/2018 | Costello | F15B 21/041 | |
| 2018/0274657 A1* | 9/2018 | Trimmer | B01D 35/306 | |
| 2019/0083911 A1* | 3/2019 | Li | B01D 35/143 | |
| 2019/0284975 A1* | 9/2019 | Saupe | B01D 35/18 | |
| 2020/0054973 A1* | 2/2020 | Wildermuth | B01D 29/23 | |
| 2020/0072337 A1* | 3/2020 | Nakano | F01M 1/16 | |
| 2020/0088145 A1* | 3/2020 | Villaire | F02M 37/22 | |
| 2021/0001251 A1* | 1/2021 | Nodomi | B01D 29/23 | |

FOREIGN PATENT DOCUMENTS

| | | | | |
|---|---|---|---|---|
| EP | 3378548 A1 * | 9/2018 | | B01D 29/902 |
| GB | 2171024 A | 8/1986 | | |
| GB | 2506509 A | 4/2014 | | |
| GB | 2560721 A * | 9/2018 | | B01D 35/30 |
| JP | H0512832 U | 2/1993 | | |
| JP | 2007247667 A | 9/2007 | | |

OTHER PUBLICATIONS

Search Report for GB 1704431.4, dated Jun. 1, 2017.
Examination Report issued in GB Application No. 1704431.4, dated Nov. 1, 2019.
Communication Pursuant to Article 94(3) issued in EP Patent Application No. 18 162 950.2, dated Oct. 23, 2019.
Examination Report issued in GB Application No. 1704431.4, dated Apr. 20, 2020.
Communication Pursuant to Article 94(3) issued in European Patent Application No. 18 162 950.2, dated May 27, 2020.

* cited by examiner

OIL FILTER ASSEMBLY

FIELD OF THE INVENTION

The present invention relates to an oil filter assembly for a drive axle; and a drive axle assembly comprising an oil filter.

BACKGROUND OF THE INVENTION

An oil filter is a filter designed to remove contaminants from engine oil, transmission oil, lubricating oil, or hydraulic oil. In a working machine, such as an excavator, lubricating oil is provided within a drive axle for lubricating the components contained therein, e.g. the drive arrangement differential and reduction gears, as well as oil immersed disc brakes, in some machines.

Through this continuous lubrication process, the oil becomes contaminated with impurities such as metals and other common contaminants such as sulphur and particles of friction material from brakes. These impurities in the oil can result in an increase in the damage to components of the working machine, and can accelerate 'oil wear' such as shearing or additive loss from the oil. Due to this, oil filters are typically provided in such systems.

Traditionally, the oil filters for axles have been provided in the form of a magnetic 'drain plug' filter. These drain plugs work to magnetically attract the magnetic impurities (i.e. ferrous metal particles) in the oil. The drain plugs need to be regularly removed from the axle, wiped clean to remove the material that has built up, and re-inserted into the axle. Such drain plug arrangements are limited in that they are only able to filter out magnetic impurities. Due to this, the oil needs to be changed regularly due to the build-up of non-magnetic impurities. Provision of an oil pump increases the cost and complexity of the axle system, which is undesirable. Furthermore, in order to effectively filter out impurities a separate pump is typically required, so as to force the oil to flow through a filter element.

The present invention seeks to overcome or at least mitigate one or more problems associated with the prior art.

SUMMARY OF THE INVENTION

A first aspect of the invention provides for an oil filter assembly for an axle assembly, the oil filter assembly comprising: a filter housing for releasably mounting in an axle assembly housing, the filter housing defining an internal volume for containing oil to be filtered; a mounting arrangement for releasably securing the filter assembly to an axle assembly housing; and a filter element for filtering particulate contaminants from oil in an axle assembly housing, wherein the filter housing comprises an inlet on an upper portion thereof and an outlet on a lower portion thereof to define an flow path therethrough, further wherein the filter element is located downstream of the inlet.

Advantageously, providing a filter assembly where the inlet is positioned above the outlet allows oil to flow therethrough under the force of gravity, which removes the need for any pumps or external components to function.

The filter housing may be configured for insertion through an aperture in an axle assembly housing.

Advantageously, enabling the filter assembly to be inserted in this simplifies its inspection and maintenance.

The mounting arrangement may be provided for mounting the filter housing to an external wall of an axle assembly housing.

Advantageously, mounting the filter to an external wall makes the mounting conveniently accessible for maintenance.

The filter element may be provided on the filter housing, and may define the housing outlet.

Advantageously, this arrangement may simplify manufacture of the filter assembly, and ensures that all of the oil passes through the filter prior to exiting the assembly.

The filter element may be arranged to substantially cover the filter housing outlet.

The filter is provided as an array of apertures. Each aperture diameter may be between 50 and 200 microns. Each aperture diameter may be between 70 and 90 microns. Each aperture diameter may be approximately 80 microns.

Advantageously, this range of diameters are large enough so as to not significantly reduce the flow rate therethrough or become clogged, whilst being small enough to effectively filter out debris from the oil, whilst also not removing any additives contained within the oil.

The apertures may be provided on the filter housing.

The array of apertures may be provided over at least 25% of the filter housing. The array of apertures may be provided over at least approximately 50% of the housing.

Advantageously, this provides a large filter area which increases the flow rate through the filter and also increases the time interval between filter changes.

The internal volume of the housing may be separated into a lower chamber and an upper chamber. The oil filter assembly may comprise a baffle element for restricting the flow of oil from the lower chamber into the upper chamber.

Advantageously, this arrangement reduces unwanted return flow of oil as the vehicle to which the axle is filtered moves over uneven ground.

The baffle element may comprise a plate having an aperture therein. The aperture may comprise a lip portion extending towards the housing outlet.

Advantageously, this arrangement is an effective way of reducing return flow of contaminants within the oil.

The aperture in the plate may be offset from the housing inlet.

Advantageously, this further reduces the return flow of contaminants oil through the filter.

The mounting arrangement may have an asymmetric feature to prevent the fitting of the filter assembly in an incorrect orientation.

Advantageously, this arrangement ensures the correct operation of the filter

The mounting arrangement may comprise a mounting plate having two apertures therethrough for receiving fasteners for securing the filter assembly to an external surface of an axle assembly housing.

Advantageously, this provides an easy way of releasably securing the oil filter to the axle housing.

The two apertures may not have rotational symmetry about an elongate axis of the filter housing.

Advantageously, this prevents the oil filter from being installed onto an axle assembly in the incorrect orientation and ensures that the inlet is positioned substantially above the outlet.

The oil filter assembly may further comprise a magnetic filter.

Advantageously, providing a magnetic filter further improves the filtering capabilities of the oil filter assembly.

The filter housing may be formed from steel and/or a plastics material and/or aluminium.

According to a second embodiment of the invention, there is provided a differential assembly for a working machine, the differential assembly comprising: a differential housing; a differential gearing for transmitting power from a drive shaft to a drive axle; and an oil filter assembly, according to the first aspect of the invention.

According to a third embodiment of the invention, there is provided an axle assembly for a working machine, the axle assembly comprising a differential assembly according to the second aspect of the invention.

BRIEF DESCRIPTION OF THE DRAWINGS

Embodiments of the invention will now be described by way of example only with reference to the accompanying drawings, in which.

DETAILED DESCRIPTION OF EMBODIMENT(S)

Figure 1:
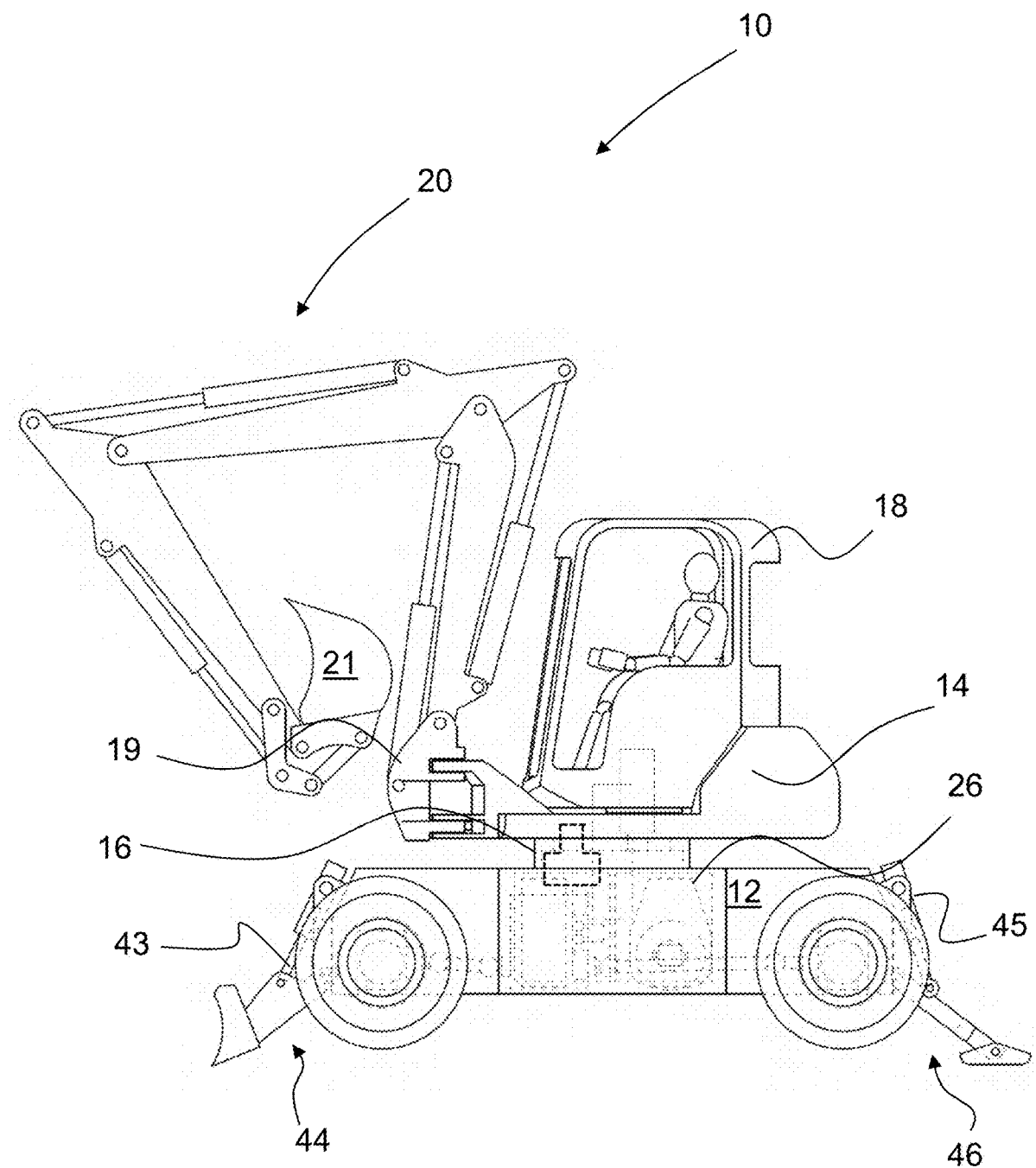
FIG. 1 is a side view of a working machine according to an embodiment of the present invention.

Referring firstly to FIG. 1, there is illustrated a working machine 10 incorporating an oil filter according to an embodiment of the present invention. In the present embodiment, the working machine may be considered to be a wheeled excavator. In other embodiments, the working machine may be a backhoe loader, telehandler, tractor, loading shovel or the like.

In this embodiment, the machine comprises an undercarriage 12 and a superstructure 14 linked by a slewing mechanism in the form of a slewing ring 16. The slewing ring 16 permits unrestricted rotation of the superstructure relative to the undercarriage 12. A cab 18 from which an operator can operate the working machine is rotatably mounted to the superstructure. A working arm arrangement 20 is rotatably mounted to the superstructure 14 via kingpost arrangement 19 and provided for performing excavating operations. The working arm 20 has a working implement 21 mounted at the distal end thereof.

The undercarriage 12 is connected to a ground engaging structure, which in this embodiment includes first and second drive axle assemblies 22a and 22b mounted to the undercarriage 12 and has wheels rotatably attached to each axle end. The second drive axle assembly 22b is fixed with respect to the undercarriage 12, whereas the first drive axle assembly 22a is capable of limited articulation, thereby permitting the wheels to remain in ground contact, even if the ground is uneven. The wheels 24a, 24b, 24c, 24d, are typically provided with off-road pneumatic tyres. In this embodiment both drive axle assemblies 22a and 22b are steer axles, but this may not always be the case.

Figure 2:
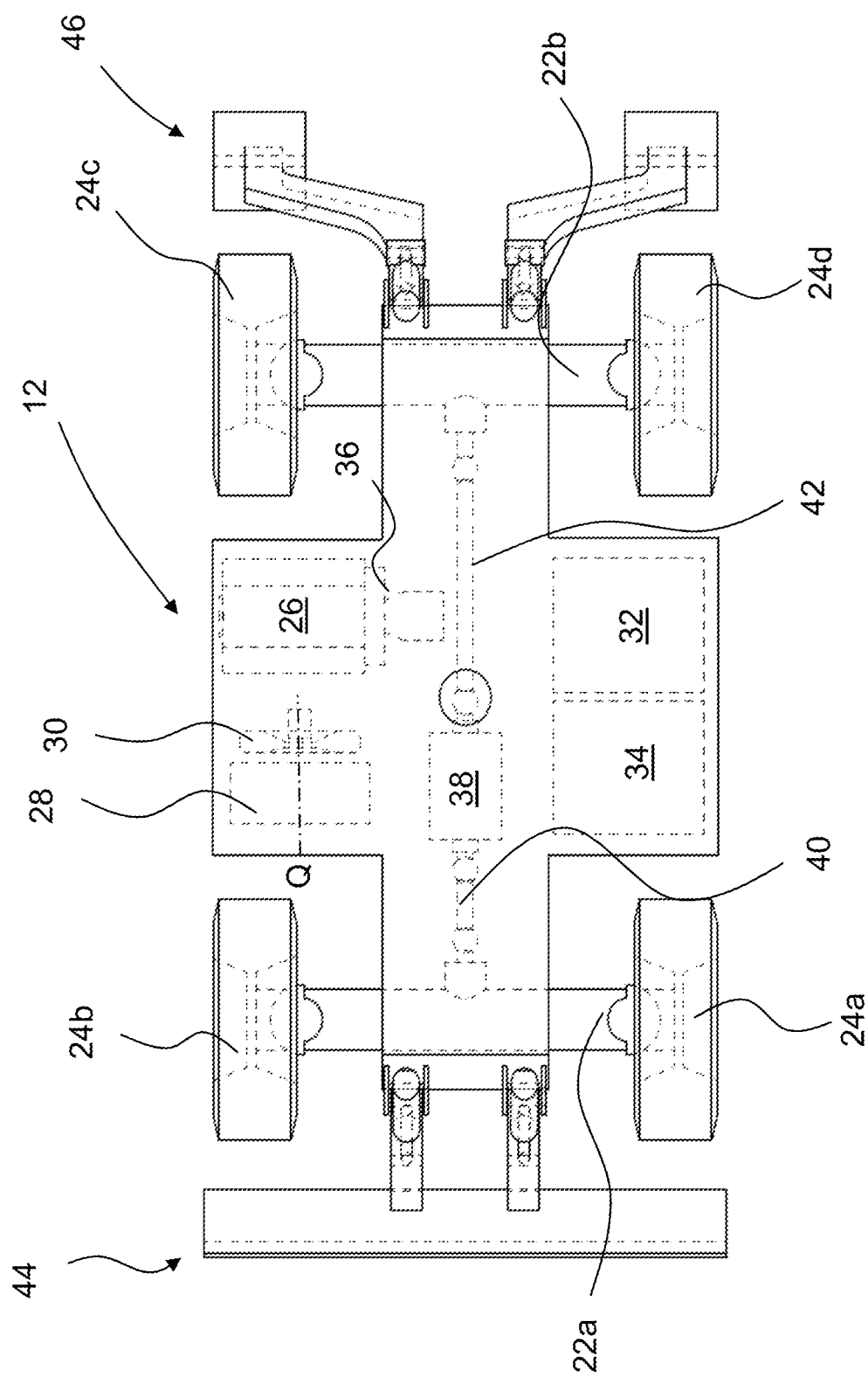
FIG. 2 is a bottom schematic view of the working machine of FIG. 1.

Referring now to FIG. 2, a prime mover in the form of a diesel internal combustion (IC) engine 26 is mounted to one side of the central fore-aft axis of the undercarriage. A heat exchanger 28 and cooling fan 30 are housed in the undercarriage adjacent the engine 26. A fuel tank 32 providing a fuel supply to the engine 26 is positioned on an opposite side of undercarriage to the engine 26. A hydraulic tank 34 is provided adjacent the fuel tank 32.

The engine 26, heat exchanger 28, cooling fan 30, fuel tank 32 and hydraulic tank 34 are all housed in a region between the axle assemblies 22a and 22b. In the present embodiment, the transmission is a hydrostatic transmission, but in alternative embodiments the transmission may be mechanical or electrical. The transmission includes a hydraulic pump 36 and a hydraulic motor 38. The engine 26 is configured to drive the pump 36, and the pump 36 is configured to supply hydraulic fluid from the hydraulic fluid tank 34 to the hydraulic motor 38. The hydraulic motor 38 rotates two drive shafts 40, 42 that rotate the axle assemblies 22a, 22b to propel the working machine 10 along the ground. The hydraulic pump 36 further supplies hydraulic fluid to hydraulic cylinders for operating the working arm arrangement and hydraulic cylinders 43, 45 for operating the dozer blade 44 and stabiliser arrangement 46.

Figure 3:
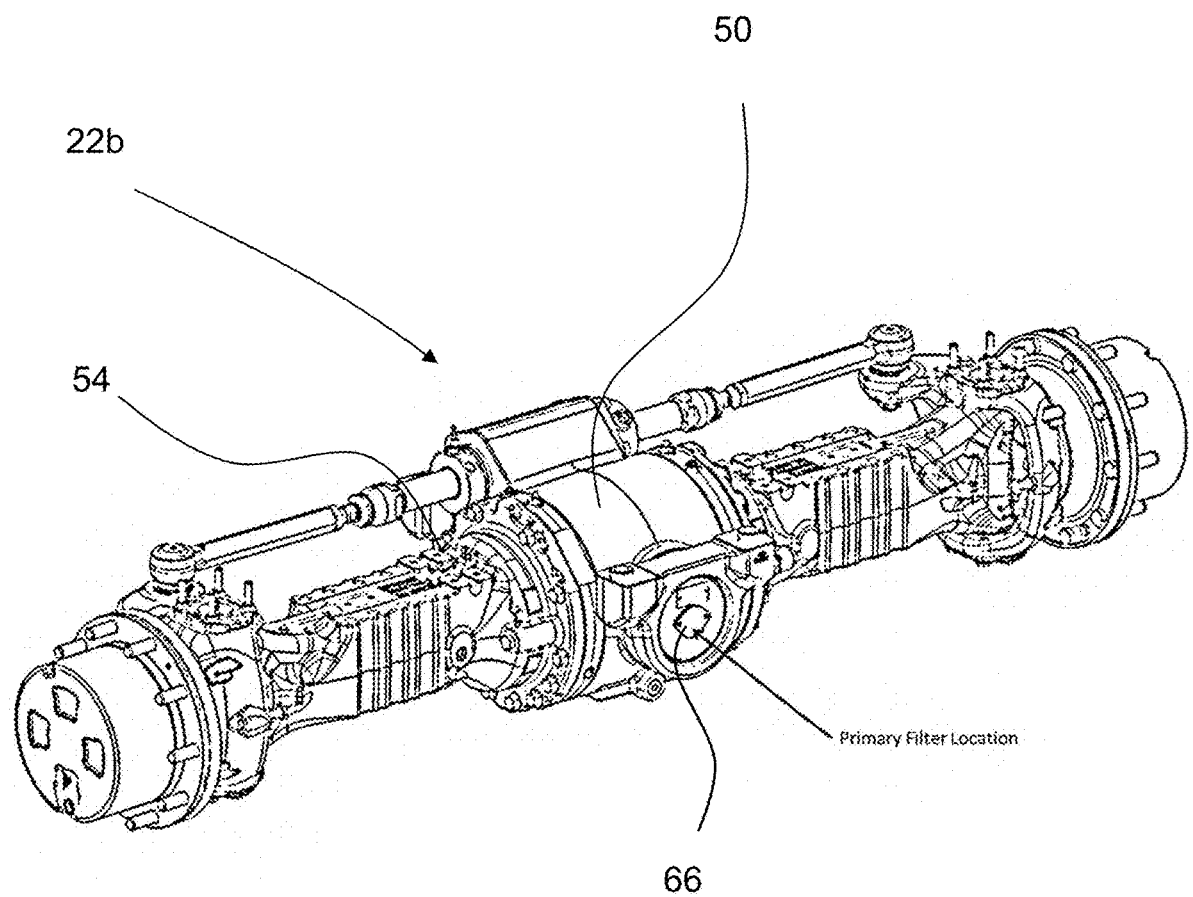
FIG. 3 is an isometric view of a drive axle assembly according to an embodiment of the present invention and of the type fitted to the working machine of FIGS. 1 and 2.
Figure 4:
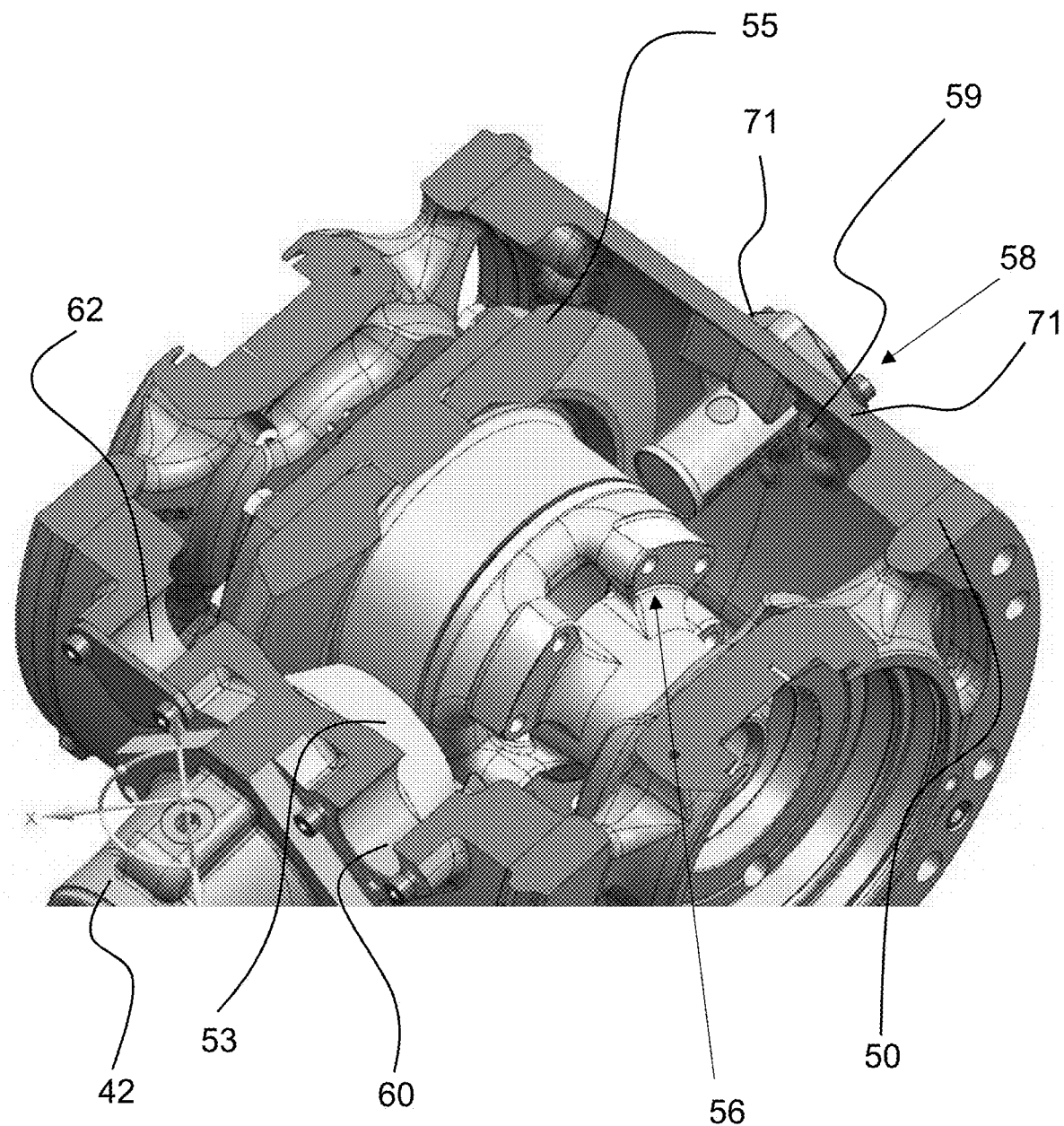
FIG. 4 is a partially cut away isometric view of the drive axle assembly of FIG. 3.
Figure 5:
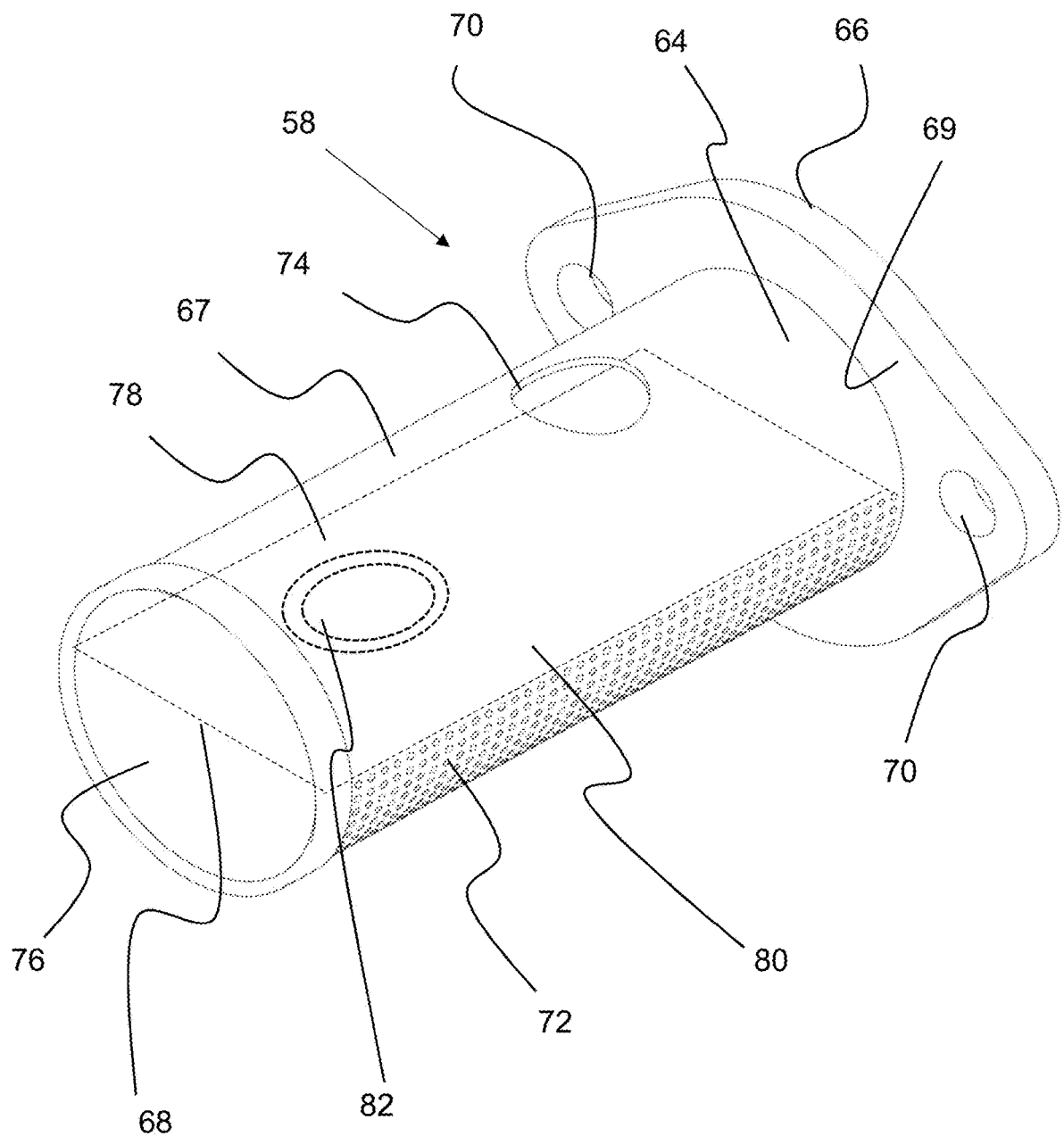
FIG. 5 is an isometric view of an oil filter assembly according to an embodiment of the present invention with the interior thereof shown in broken lines.
Figure 6:
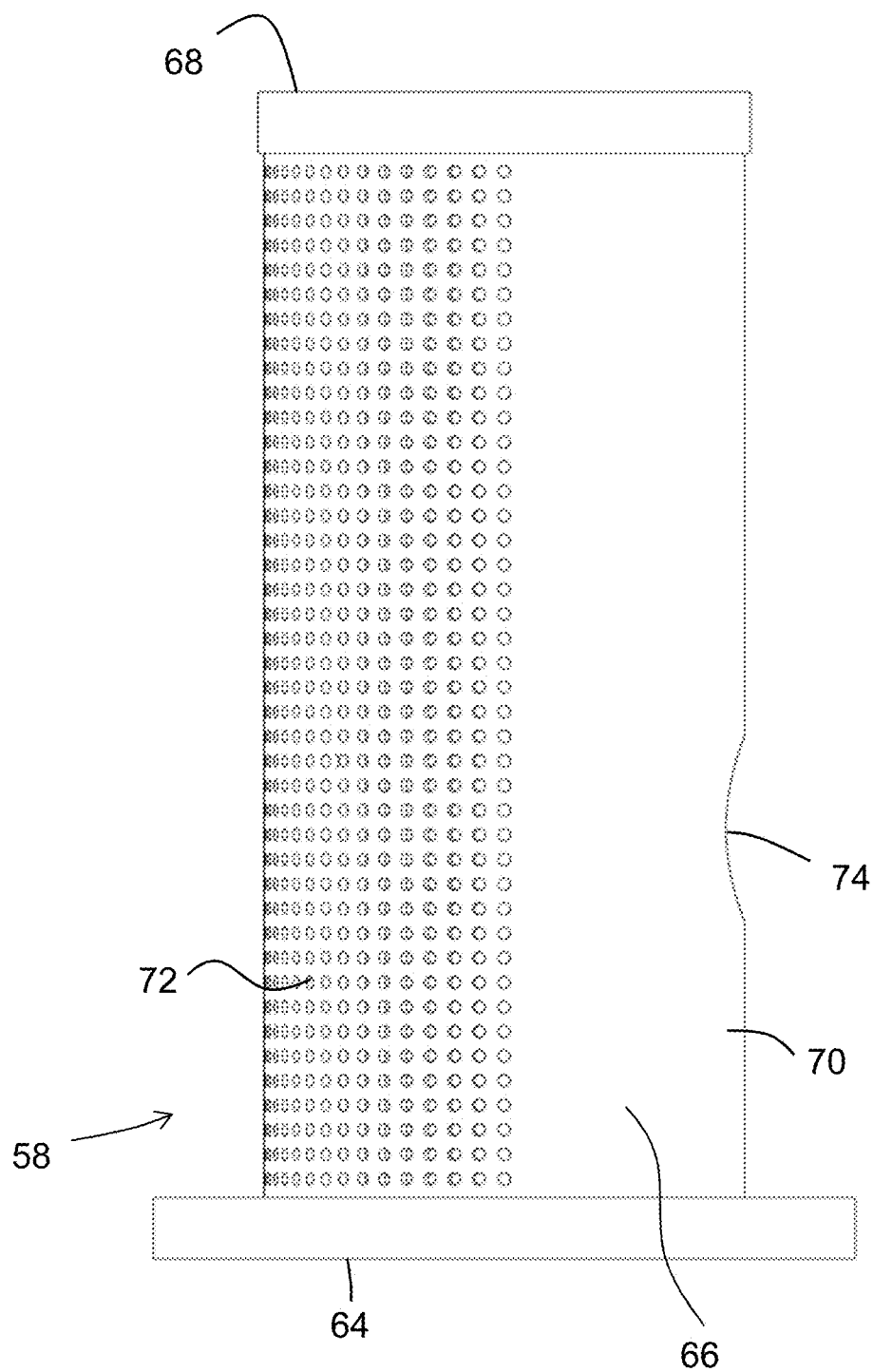
FIG. 6 is a side view of the oil filter assembly of FIG. 5.

Referring now to FIGS. 3 and 4, a drive axle assembly 22b is illustrated in more detail. In the illustrated embodiment the drive axle is also a steering axle, but in alternative arrangements it may be fixed. The drive axle assembly 22b includes a differential housing 50 located substantially centrally along the axle assembly 22b which differential 56 receives drive from the drive shaft 42 end via a pinion 53 and crown wheel 55 transmits the drive to two axle shafts (not shown) to transmit final drive to the wheels 24c and 24d.

The differential housing also accommodates a suitable oil immersed disc brake arrangement (not shown), to provide for service and park braking of the machine. In alternative arrangements, this may not be required however. In further alternative arrangements, the differential housing may be offset from the centre of the axle assembly.

The differential housing 50 includes an aperture 59 for receiving an oil filter assembly 58 therethrough. In the illustrated embodiment, the oil filter assembly 58 is provided substantially centrally along the elongate axis of the axle assembly 22b, on the opposite side of the housing 50 to the drive shaft 42. This arrangement positions the oil filter assembly 58 proximate to the crown wheel 55. Movement of the working vehicle 10 results in rotation of the crown wheel 55, which is partially immersed in oil, which works to churn the oil contained within the differential housing 50. Due to this, the oil is constantly being moved around the inside of the differential housing 50. This movement of the oil works to shower some of the oil onto the oil filter assembly 58.

In alternative arrangements, the oil filter assembly may be arranged so as to extend through the aperture 60 or 62. In further alternative arrangements, more than one oil filter may be provided. It will be appreciated that only one of the housing apertures 59, 60, 62 may be provided, if only one oil filter assembly is to be used. Mounting the oil filter assembly 58 within the differential housing 50 protects the oil filter from damage from external objects during operation of the working machine.

Referring now to FIGS. 5 to 9, the oil filter assembly 58 is illustrated in more detail. The oil filter assembly 58 incudes a housing 64 for inserting through the aperture 59 in the differential housing 50. The filter housing 64 includes a first end 66 and a second end 68 and a side face 67 extending therebetween. The filter housing 64 defines an internal volume for receiving oil therein. In the illustrated embodiment, the filter housing 64 is substantially cylindrical, but it will be appreciated that any suitable shape defining an internal space to capture oil may be provided, and may be varied to suit the application.

The filter housing 64 has an inlet 74 on an upper portion thereof. The filter housing 64 has an outlet on a lower portion thereof. The inlet and the outlet define a flow path therethrough. Providing a filter assembly having an inlet positioned above the outlet allows oil to flow therethrough under the force of gravity. This enables the oil filter 58 to function without the need of an external pump, such that the oil filter 58 can be considered to be a passive oil filter.

The first end 66 of the oil filter 58 is provided as a mounting arrangement 66. The mounting arrangement 66 is provided in the form of a mounting plate of larger size than the main body of the filter so that the plate overlaps the perimeter of the aperture 59 in the differential housing 50. The mounting arrangement 66 is provided so as to releasably secure the oil filter assembly 58 to the differential housing 50 with the filter housing 64 projecting therethrough. The mounting plate 66 includes two bores 70 therethrough for receiving fasteners 71 (e.g. bolts) to secure the filter to the drive axle housing 50 (via corresponding non-visible threaded bores in the axle housing). A suitable seal or gasket (not shown) may be provided on a contacting face 69 of the mounting plate 66 to inhibit the leakage of oil.

Figure 7:
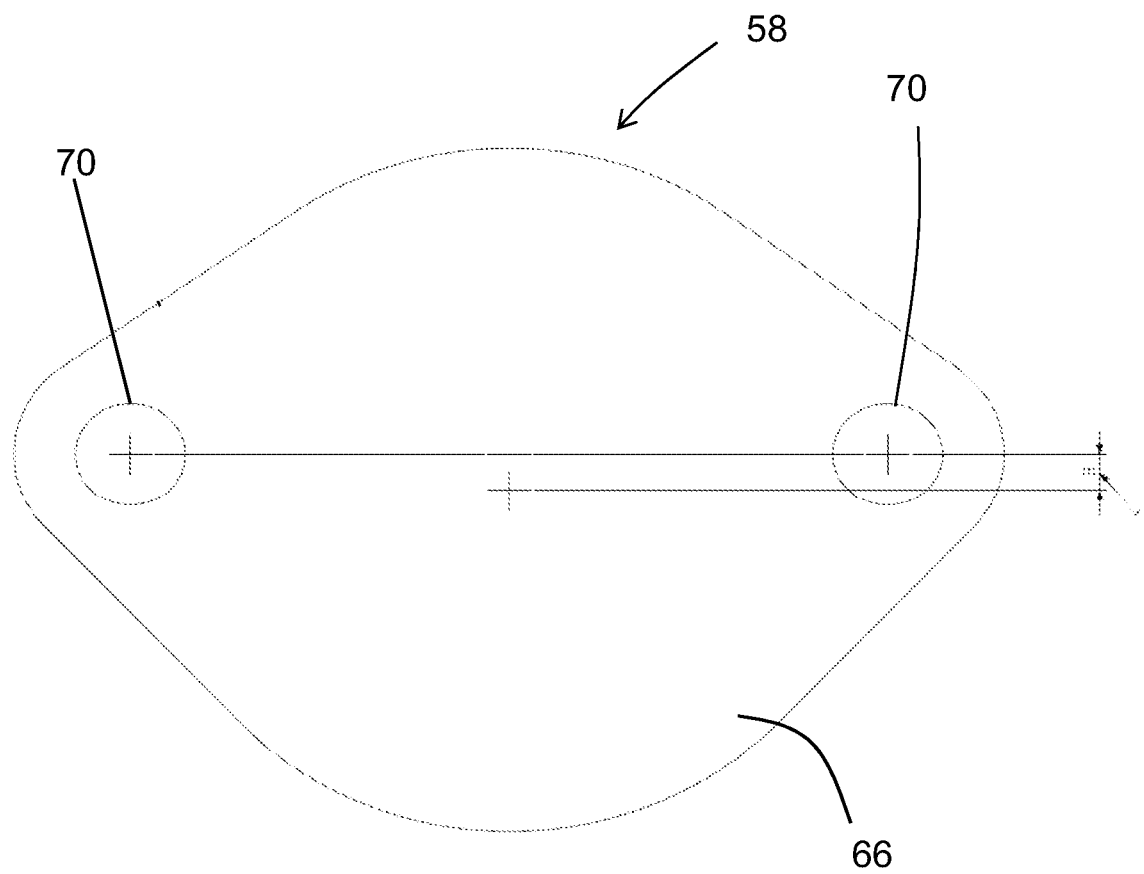
FIG. 7 is an end view of the oil filter assembly of FIG. 5.

Referring now to FIG. 7, the mounting arrangement 66 is illustrated in more detail. The two apertures 70 on the mounting plate 66 are arranged such that the oil filter assembly 58 is only able to be secured to the drive axle housing 50 in a correct position. This arrangement ensures that the inlet 74 is only mountable uppermost, such that it is positioned substantially above the outlet.

In the illustrated embodiment, this correct fitting feature is provided by the two apertures 70 not having rotational symmetry about an elongate axis of the filter housing, in combination with the aperture 59 being a relatively close fit with the dimensions of the side face 67. As is shown in FIG. 7, the bores 70 are positioned away from the central elongate axis A of the plate 66. This means that in anything other than the orientation shown, the bores 70 are not capable of alignment with corresponding bores on the differential housing 50, and the fasteners 71 cannot mount the filter thereto.

The oil filter 58 further includes a filter element (not visible) for filtering metal and particulate contaminants from the oil. In the illustrated embodiment, the filter element is supported directly on the housing 64. The element is in this embodiment in the form of a fine mesh of steel wires that is situated on top of an array of larger apertures 72 that form the outlet. Specifically, the apertures are provided in that housing 64, and the mesh extends around the housing 64, e.g. the mesh is wrapped around the housing 64. The mesh has an aperture size of approximately 80 microns. However, the mesh size can be adjusted to suit the application, the oil viscosity and the oil temperature. It has been found that a suitable flow rate can be achieved, whist still effectively filtering the contaminants from the oil, for aperture diameters of between 50 and 200 microns, e.g. between 50 and 150 microns. The filter element may be replaceable in this embodiment, e.g. if the first end 66 or second end 67 of the housing are made to be removable.

Testing of this filter size in a rig utilising oil that had been recovered from a machine in which it had been used in for 1500 hours revealed a steady improvement in oil clarity once the filter had been put in place. Further, after 65 hours of running a filtration efficiency of 96% was achieved. Similar tests of a mesh filter with larger apertures also achieve good filtration efficiency; at 100 microns an efficiency of 80% was achieved.

In the illustrated embodiment, the array of apertures 72 are provided over approximately 50% of the oil filter assembly housing 64 (e.g. the lower half of the housing), but the apertures may be provided over 25% or 75% of the housing 64, or any other suitable amount. It will be appreciated that whatever the coverage of the housing 64 with apertures 72, the mesh provided will be extend around the entire filter housing 64.

It will be appreciated that, in alternative arrangements, the filter element may be an integral part of the housing 64. This arrangement may reduce the cost of the filter assembly, and ensures that all of the oil passes through the filter as it flows out of the oil filter assembly 58. In further alternative embodiments the filter element may be suspended or supported above the outlet 72, which may improve its flow characteristics.

In the illustrated embodiment, the internal volume of the filter housing 64 is separated into a lower chamber 76 and an upper chamber 78. In the illustrated embodiment, the array of apertures 72 of the outlet and mesh substantially cover the entire of the housing of the lower chamber 76. The lower chamber 76 and the upper chamber 78 are separated by an elongate plate 80 housed within the filter housing 64 and substantially extends the length of the housing 64, to act as a baffle.

Figure 8:
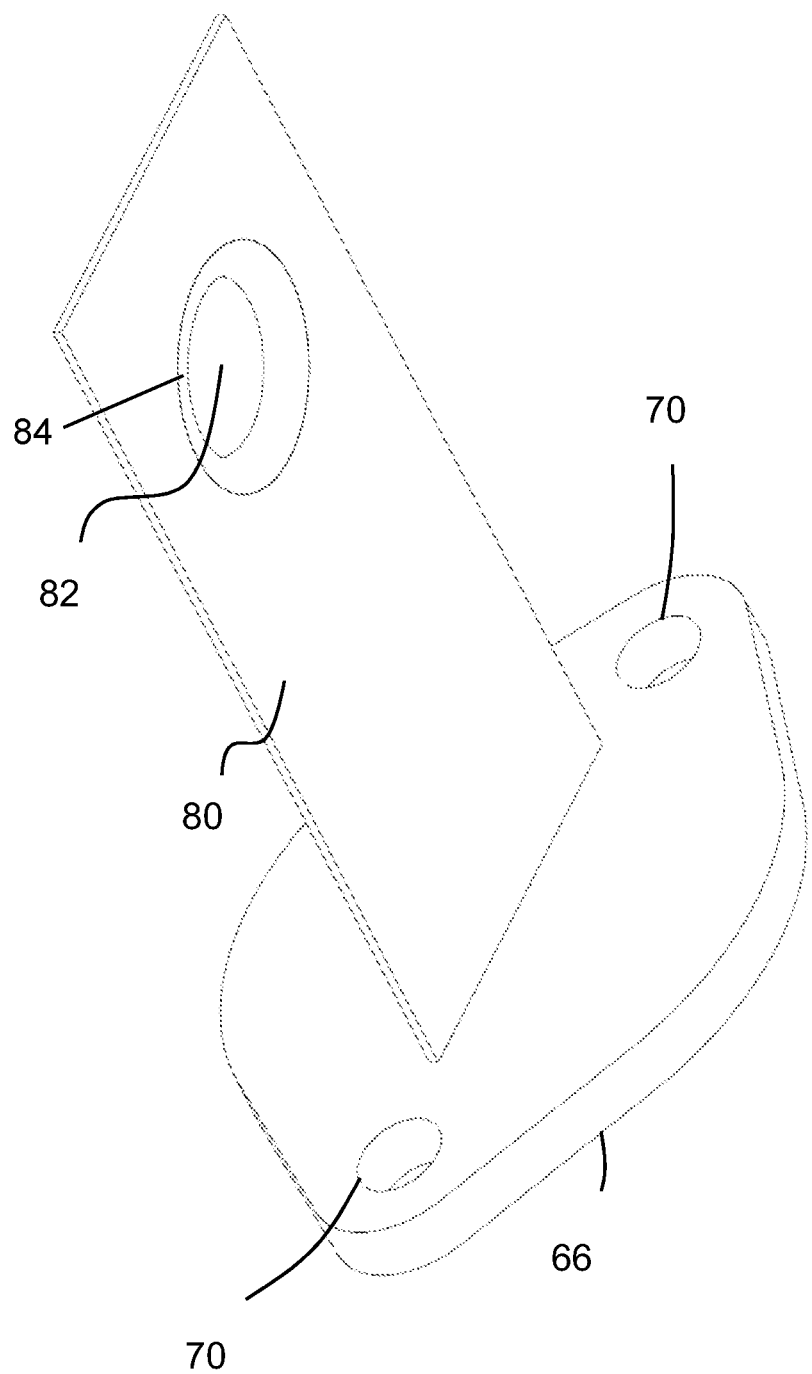
FIG. 8 is an isometric view of the oil filter assembly of FIG. 5 with the housing removed for clarity.
Figure 9:
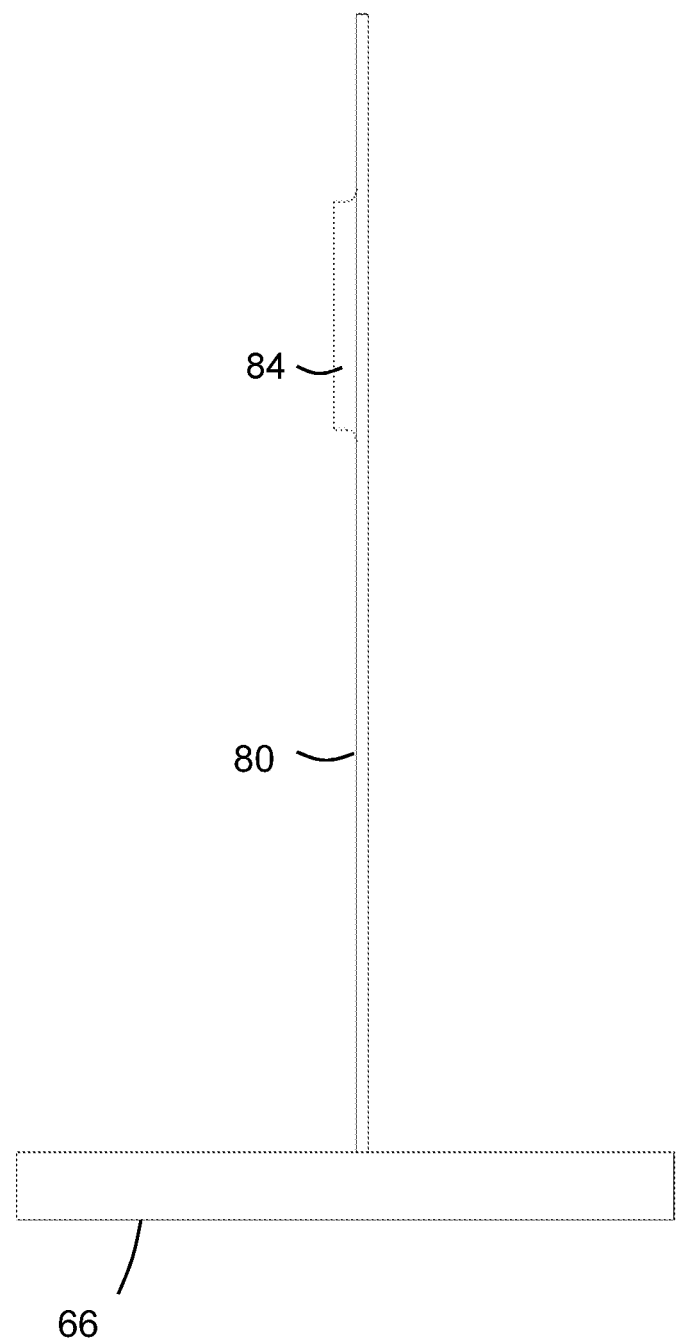
FIG. 9 is a side view of the oil filter assembly of FIG. 8.

The plate 80, as is clearly illustrated in FIGS. 8 and 9, has an aperture 82 therein to allow oil to flow from the upper chamber 78 to the lower chamber 76 to inhibit the blackflow of oil out through the inlet 74 if the filter is jolted due to movement of the machine over uneven ground, or due to a change in direction of the working machine. The aperture 82 has a lip 84 which extends away from the plane of the plate 80, and extends substantially away from the upper chamber 78. This arrangement further enhances the plate to function as a baffle element for restricting the flow of oil from the lower chamber 76 to the upper chamber 78.

It will be appreciated that in alternative arrangements, the plate may not be provided with an aperture, but instead may not extend the entire internal length of the housing 64 and may be separated from either the first 66 or second end 68 of the filter housing 64 to allow the oil to flow from the upper chamber 78 to the lower chamber 76. The plate 80 may also include a lip as described above. In further alternative arrangements, for example where the oil filter 58 is provided close to a component that is only able to rotate in a single direction, it will be understood that the oil filter assembly 58 may not include a plate 80.

Although not illustrated, the filter may incorporate a magnetic portion to capture ferrous particles. The filter may be provided in the form of a magnetic strip. The magnetic strip may be provided on the plate 80 and/or on the filter housing 64. Specifically, the magnetic strip may be provided on the plate 80 at a position substantially between the housing inlet and the plate aperture 82 so as to maximise the oil flow over the magnetic strip.

Fitting of the filter assembly 58 is achieved simply by inserting the filter housing 64 through the aperture 59 until the plate 66 contacts the differential housing 50. The filter assembly 58 is rotated until the bores 70 align with the corresponding bores on the housing 50. The fasteners 71 are then fitted and suitably torqued to seal the plate 66 against the differential housing 50. Removal for inspection or replacement is achieved by the reverse process.

Figure 10:
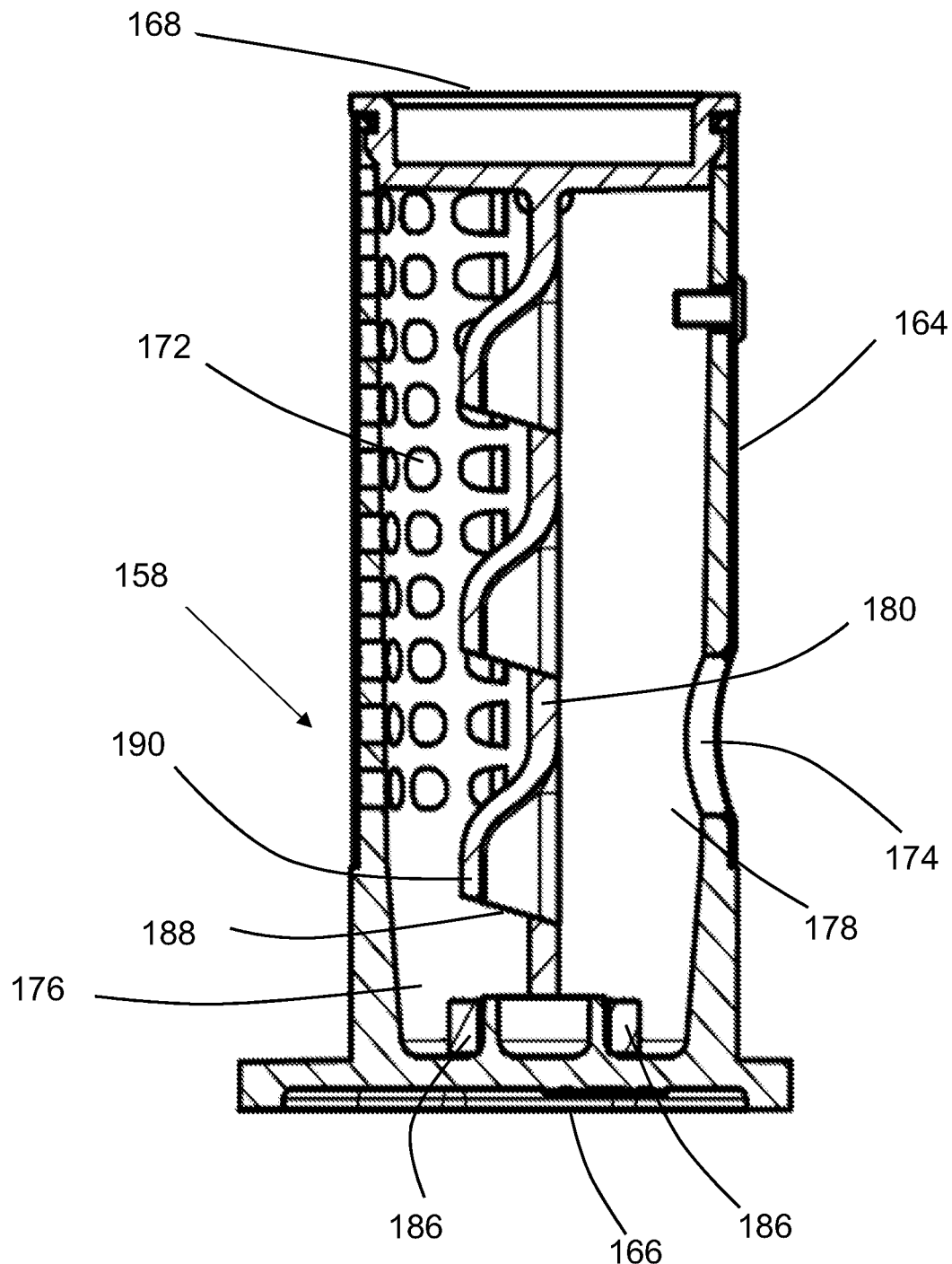
FIG. 10 is a cross-sectional side view of an oil filter assembly according to an embodiment of the invention.

Referring now to FIG. 10, an oil filter assembly according to an embodiment of the invention is illustrated and is indicated generally at 158. Like features with reference to FIGS. 5 to 9 and labelled with the prefix '1', and only differences are discussed.

The internal volume of the housing 164 is separated into a lower chamber 176 and an upper chamber 178. The lower chamber 176 and the upper chamber 178 are separated by an elongate plate 180 contained within the filter housing 164, which acts as a baffle arrangement.

In the exemplary illustrated embodiment, the plate 180 is provided in the form of a louvre. That is, the plate 180 includes three openings 188 therein. The openings 188 are provided in the form of recessed regions 190 of the plate 180, where the opening 188 is provided in a side wall of said recess 190. In alternative arrangements, it will be appreciated that any suitable number of openings 188 may be provided. This arrangement of openings, in particular the recessed regions 190, prevent oil from flowing through the plate 180 in a direction orthogonal to the plate (i.e. directly from the upper chamber 178 to the lower chamber 176), and works to direct the flow of oil away from the apertures 172.

The oil filter assembly 110 incorporates a magnetic filter in order to capture ferrous particles present within the oil. In the exemplary illustrated embodiment, two magnetic filters 186 are provided proximate to the mounting plate 166. Specifically, a first magnetic filter 186 is positioned in the upper chamber 178 and a second magnetic filter 186 is positioned in the lower chamber 176. In alternative arrangements, it will be appreciated that the position of the magnetic filters may be adjusted to suit the application. Additionally, it will be appreciated that one, three or any suitable number of magnetic filters may be provided.

Although the invention has been described above with reference to one or more preferred embodiments, it will be appreciated that various changes or modifications may be made without departing from the scope of the invention as defined in the appended claims.

Alternative "poka yoke" features may for example be provided in the filter assembly such as notches or projections on the mounting plate that have corresponding features on the axle housing which do not have rotational symmetry. Alternatively, the filter housing itself may not have rotational symmetry and may only fit in the aperture in one orientation.

Rather than projecting through a wall in the axle housing the filter assembly may be mounted within the axle housing in a location where removing a separate cover allows access thereto and removal thereof. The filter element may be formed of other suitable materials such as a mesh of plastics material, a non-woven fibrous material or aluminium.

The oil filter assembly may further include an additional filter element, e.g. a paper filter element, provided in the lower chamber. Such an additional filter would aid retention of the filtered contaminants within the lower chamber of the oil filter assembly.

Although the oil filter has been described above as being positioned close to a differential gearing of an axle assembly, it will be appreciated that the oil filter assembly as described above is suitable for use with any rotation component that could churn up oil so as to be caused to flow into the oil filter housing.

The invention claimed is:

1. An oil filter assembly for an axle assembly, the oil filter assembly comprising:
   a filter housing for releasably mounting in an axle assembly housing, the filter housing defining an internal volume for containing oil to be filtered;
   a mounting arrangement for releasably securing the filter assembly to an axle assembly housing; and
   a filter element for filtering particulate contaminants from oil in an axle assembly housing,
   wherein the filter housing comprises an inlet extending through an upper wall portion for introducing oil into the internal volume and an outlet through a lower portion of the filter housing to define a flow path through the filter housing between the inlet and the outlet,
   wherein the filter housing includes a baffle plate separating the internal volume of the filter housing into an upper chamber and a lower chamber, the baffle plate including at least one aperture to allow oil to flow from the upper chamber into the lower chamber, the baffle plate further being configured to restrict backflow of oil from the lower chamber into the upper chamber; and
   wherein the filter element is arranged to cover the outlet or is provided over the filter housing to define the outlet.

2. An oil filter assembly according to claim 1, wherein the filter housing is configured for insertion through an aperture in an axle assembly housing.

3. An oil filter assembly according to claim 1, wherein the mounting arrangement is provided for mounting the filter housing to an external wall of an axle assembly housing.

4. An oil filter assembly according to claim 1, wherein the filter housing includes an array of apertures forming the outlet.

5. An oil filter assembly according to claim 4, wherein each aperture diameter is between 50 and 200 microns.

6. An oil filter according to claim 4, wherein the array of apertures are provided over at least 25% of the filter housing, preferably approximately 50% of the housing.

7. An oil filter according to claim 1, wherein the at least one aperture in the baffle plate is a louvre.

8. An oil filter according to claim 1, wherein the at least one aperture comprises a lip portion extending towards the housing outlet.

9. An oil filter assembly according to claim 1, wherein the at least one aperture in the baffle plate is offset from the inlet of the filter housing.

10. An oil filter assembly according to claim 1, wherein the mounting arrangement has an asymmetric feature to prevent the fitting of the filter assembly to the axle assembly housing in an incorrect orientation.

11. An oil filter assembly according to claim 1, wherein the mounting arrangement comprises a mounting plate having two apertures therethrough for receiving fasteners for securing the filter assembly to an external surface of an axle assembly housing.

12. An oil filter assembly according to claim 11, wherein the two apertures do not have rotational symmetry about an elongate axis of the filter housing.

13. An oil filter assembly according to claim 1, further comprising a magnetic filter.

14. An oil filter assembly according to claim 1, wherein the filter housing is formed from at least one or more of steel, a plastics material, or aluminum.

15. An oil filter assembly for an axle assembly, the oil filter assembly comprising:
   an elongate filter housing for releasably mounting in an axle assembly housing, the elongate filter housing defining an internal volume;

an elongate baffle dividing said internal volume into an upper chamber and a lower chamber, said elongate baffle restricting the flow of oil from the lower chamber into the upper chamber;

an inlet extending through an upper wall portion of said elongate filter housing above said elongate baffle for introducing oil into said upper chamber;

an array of apertures below said elongate baffle extending through a lower wall portion of said elongate filter housing and forming an outlet for oil as it exits said lower chamber; and a mounting arrangement at one end of said elongate filter housing for releasably securing the filter assembly to said axle assembly housing;

wherein said filter assembly, when mounted on and extending into said axle assembly housing, defines a flow path where oil to be filtered enters said upper chamber through said inlet, passes through said elongate baffle, and is filtered by a filter element disposed adjacent the array of apertures as the oil passes through said array of apertures and out of said lower chamber, assisted by the influence of gravity.

16. An oil filter assembly according to claim 15, wherein the elongate baffle is louvered and is arranged to restrict oil from flowing through the elongate baffle in a direction orthogonal to the elongate baffle.

17. An oil filter assembly according to claim 15, wherein the elongate filter housing is sized and shaped for insertion through an orifice in an external wall of the axle assembly and is securable to the external wall.

18. An oil filter assembly according to claim 15, wherein the array of apertures are provided over at least 25% of the elongate filter housing.

19. A differential assembly for a working machine, the differential assembly comprising:

a differential housing;

a differential gearing for transmitting power from a drive shaft to a drive axle; and an oil filter assembly, the oil filter assembly including:

an elongate filter housing for releasably mounting in an axle assembly housing, the elongate filter housing defining an internal volume;

an elongate baffle dividing said internal volume into an upper chamber and a lower chamber, said elongate baffle restricting the flow of oil from the lower chamber into the upper chamber;

an inlet extending through an upper wall portion of said elongate filter housing above said elongate baffle for introducing oil into said upper chamber;

an array of apertures below said elongate baffle extending through a lower wall portion of said elongate filter housing and forming an outlet for oil as it exits said lower chamber; and a mounting arrangement at one end of said elongate filter housing for releasably securing the filter assembly to said axle assembly housing;

wherein said filter assembly, when mounted on and extending into said axle assembly housing, defines a flow path where oil to be filtered enters said upper chamber through said inlet, passes through said elongate baffle, and is filtered by a filter element disposed adjacent the array of apertures as the oil passes through said array of apertures and out of said lower chamber, assisted by the influence of gravity.

20. A differential assembly according to claim 19, wherein the elongate baffle is louvred, and wherein the elongate baffle is arranged to restrict oil from flowing through the elongate baffle in a direction orthogonal to the elongate baffle.

* * * * *